United States Patent [19]

Meyerle

[11] Patent Number: 5,058,028
[45] Date of Patent: Oct. 15, 1991

[54] ACTIVATING METHOD AND SYSTEM FOR CONTROLLING MULTIPLE ELECTRICALLY-ENERGIZED FACTORY TOOLS

[76] Inventor: George M. Meyerle, 15 Lakeview Dr., Brookfield, Conn. 06804

[21] Appl. No.: 447,107

[22] Filed: Dec. 6, 1989

[51] Int. Cl.$^5$ .................................... G06F 15/46
[52] U.S. Cl. ...................... 364/474.11; 364/474.19
[58] Field of Search .............. 364/184, 474.11, 474.19, 364/474.01, 474.02; 29/568; 340/825.23

[56] References Cited

U.S. PATENT DOCUMENTS

| | | | |
|---|---|---|---|
| 3,641,326 | 2/1972 | Harte | 364/474.11 |
| 4,069,488 | 1/1978 | Fiorenza et al. | 364/474.11 |
| 4,550,375 | 10/1985 | Sato et al. | 364/474.11 |

Primary Examiner—Jerry Smith
Assistant Examiner—Paul Gordon
Attorney, Agent, or Firm—Parmelee, Bollinger & Bramblett

[57] ABSTRACT

The activating method and system control multiple electrically-energized machine tools in a factory, such as electromagnetic punch presses, spot welders, elevator motors or other large motors, etc. for preventing simultaneous actuation for avoiding power surges, thus avoiding peaking of electrical loading on factory facilities. Adequate available electrical power is assured at the instant of actuation of each tool. Each tool has a microprocessor-controlled energizing switch with sensors indicating when the tool is "ready" to be actuated (fired). The microprocessor controllers are connected in a permission-signal-passing ring. The permission signal being passed is a low voltage signal of positive or negative polarity. A prime controller always passes a signal of opposite polarity from that most recently received. Each other controller always passes a signal of the same polarity as most recently received. A tool obtains permission to fire when an input signal is of opposite polarity from the most recently transmitted output signal, thus showing that permission has been passed completely around the ring. During firing of a tool, its controller refrains from passing permission, thus no other tool can receive permission to fire during permitted operation of any tool. If a permitted tool is not "ready", permission is immediately passed. A machine tool is prioritized relative to other tools by setting numbers of received permissions to fire before being allowed to fire. During counting of received permission signals, a tool continues to pass permission signals without firing, until its prioritized count is reached.

11 Claims, 2 Drawing Sheets

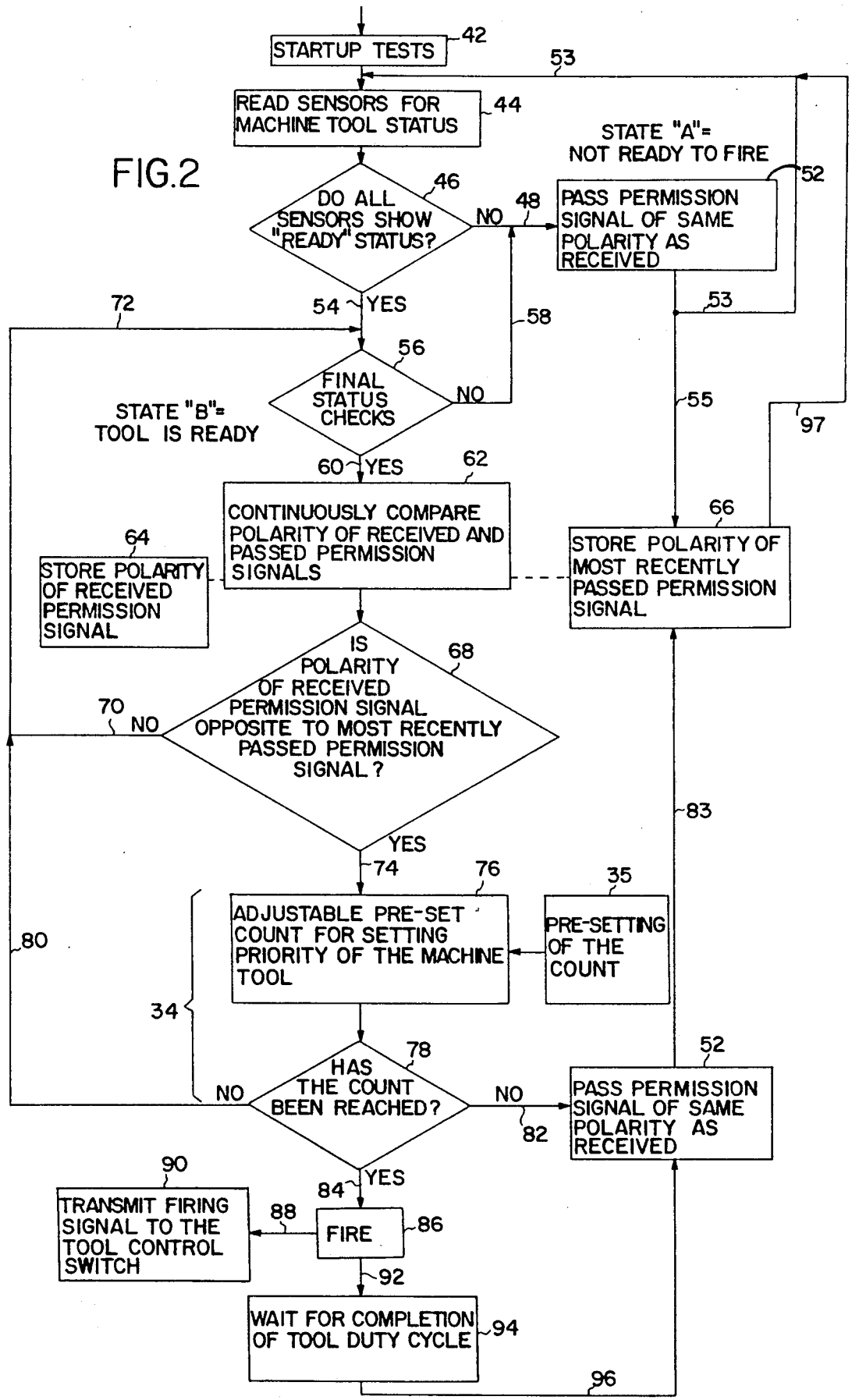

ACTIVATING METHOD AND SYSTEM FOR CONTROLLING MULTIPLE ELECTRICALLY-ENERGIZED FACTORY TOOLS

FIELD OF THE INVENTION

The present invention is in the field of controlling electrically-energized machine tools of the type which require a large surge of electrical power at the instant when the tool is turned on (fired) or require large power input during a brief duty cycle and then require very little or no power input during their standby or wait mode occurring between the brief duty cycles. The illustrative embodiment of this invention prevents more than one such machine tool in a control ring from being fired at the same time. The invention also relates to prioritizing such machine tools in a control ring, so that those tools which are more important for this week's production scheduling are allowed to operate more often than other tools whose production output is less urgent in this week's scheduling of product. The relative prioritizing can be changed daily or weekly, or more often, as desired for optimum factory production scheduling. This invention is also in the field of enabling economical modernization of a plant facility by allowing mechanical flywheel types of punch presses to be replaced with electromagnetically energized punch presses without requiring an accompanying investment for upgrading the electrical power furnishing and distribution facilities now existing in the plant.

BACKGROUND

There are powerful electrically-energized tools, for example, electromagnetic punch presses, stamping presses, spot-welding presses, and similar powerful electrical tools. Manufacturers have been hesitant or reluctant to install such electromagnetic tools, because each such tool during its brief time of operation requires a very large surge of electrical power to provide the energization for delivering the powerful movement or stroke of the tool. Such large surges of power due to multiple electromagnetic tools can overlap and thereby cause significant peaking of electrical leading, with consequent significant increases in charges from the electric utility.

For example, manufacturers have continued to use mechanically-driven presses having large rotating flywheels for delivering the required power stroke, rather than using electromagnetically energized presses. The drawbacks of such flywheel-types of presses are (i) they are bulky and require relatively large floor space, (ii) their power stroke length is fixed by the mechanical drive structures associated with the flywheel, (iii) their ballistics are mechanically fixed or predetermined by heavy flywheels such that their speed cf production cannot readily be increased, and (iv) there is not much adjustability or variability in the control of large rotating flywheels.

Replacing a significant number of flywheel-type presses, for example, twenty presses with an equal number of electromagnetic presses would normally require a considerable additional plant investment for installing increased electrical power facilities for the plant. When twenty electromagnetic presses are in operation at the same time, there is the possibility that sometimes during the workshift the operators will trigger a considerable number of these presses at about the same instant causing their power surge requirements to overlap, i.e. to cumulate, thereby placing a relatively great peak electrical demand on the electrical supply facilities of the manufacturing plant. Consequently, the electrical facilities in the plant would normally need to be of sufficiently large scale for adequately satisfying the expected peak demand or expected peak line electrical load.

Moreover, the costs of electrical energy purchased from a public utility are often dramatically increased as a result of a large "peak demand", even though the average monthly consumption of electrical power by the plant is far below this peak demand.

Also, it is to be noted that when a significant number of such powerful electrical tools are installed without a corresponding scale-up in the electrical supply facilities of the plant, then their simultaneous actuation will impose an excessive line load, causing weakened power strokes (resulting in the likely occurrence of defective parts or parts of improper quality) and/or causing incompleted power strokes due to incomplete die or punch penetration (resulting in jammed or broken tools or jammed slugs of non-ejected metal, partially punched metal or incomplete stripping away of punched metal).

SUMMARY OF THE DISCLOSURE

The activating method and system embodying the invention serve to control multiple electrically-energized machine tools in a factory, such as electromagnetic punch presses, stamping presses, spot welders, elevator motors or other large motors, etc. for preventing their simultaneous actuation. The purpose of preventing such simultaneous actuation is to avoid cumulative electrical loading on the electrical power supplying facilities for avoiding power surges, thus avoiding undesired peaking of electrical loading or the electrical power supply facilities of the factory, and for assuring that each electrically-energized tool has adequate available electrical power at its instant of actuation and during its brief duty cycle. Each tool has an energizing switch controlled by a microprocessor controller, and each tool includes sensors for showing when the tool is "ready" to be operated. For example, such sensors show that the material to be worked is in its properly aligned place, safety guards are in place, and that other necessary pre-operating conditions have been satisfied, depending upon the type of tool involved.

These microprocessor controllers are connected in a permission-signal-passing ring, wherein the permission signal being passed is a low voltage signal of positive or negative polarity. A prime controller in the ring always passes a signal voltage of opposite polarity from that which was most recently received. Each other controller in the ring always passes a signal of the same polarity as was most recently received.

A tool receives permission to fire when its input signal voltage is of opposite polarity from its most recently transmitted output signal voltage, thereby showing that the permission signal has been passed completely around the ring, thus indicating that: "No other tool is no firing." During firing of a tool, its controller refrains from passing permission, thus assuring that no other tool can receive permission to fire while there is operation of the permitted tool is proceeding. If a machine tool receives permission to be fired but is not "ready", then the permission signal is immediately passed by that unready machine.

A machine tool is prioritized relative to other tools in the control ring by pre-setting a count of the number of times that it will receive permission to fire before it is allowed to fire. During its counting of receptions of the permission signal, such a lower priority tool continues to pass the permission signal without firing (until the pre-set count has been reached), and then it proceeds to fire.

By virtue of the present invention, for example, twenty electromagnetic presses in a plant are controlled so that two or more of them cannot be actuated, i.e. triggered into operation, at the same instant. As a result, the "peak demand" is limited to the same demand as would occur for a single electromagnetic press. Consequently, the electrical supply facilities for twenty similar electromagnetic presses advantageously can be scaled at the same size as for one such press, as a result of this invention.

BRIEF DESCRIPTION OF THE DRAWINGS

The invention, together with further aspects, advantages, features and objects thereof, will be more clearly understood from a consideration of the following description taken in conjunction with the accompanying drawings showing a presently preferred embodiment of the invention.

FIG. 2 is a schematic electrical diagram showing a plurality of electromagnetically-energized machine tools "T" with their switches "S" controlled by microprocessor controllers "C" connected into a permission-signal-passing electrical ring circuit.

FIG. 3 is a functional block diagram illustrating the operation of each microprocessor controller in FIG. 1.

DETAILED DESCRIPTION OF PRESENTLY PREFERRED EMBODIMENT

Figure 1:
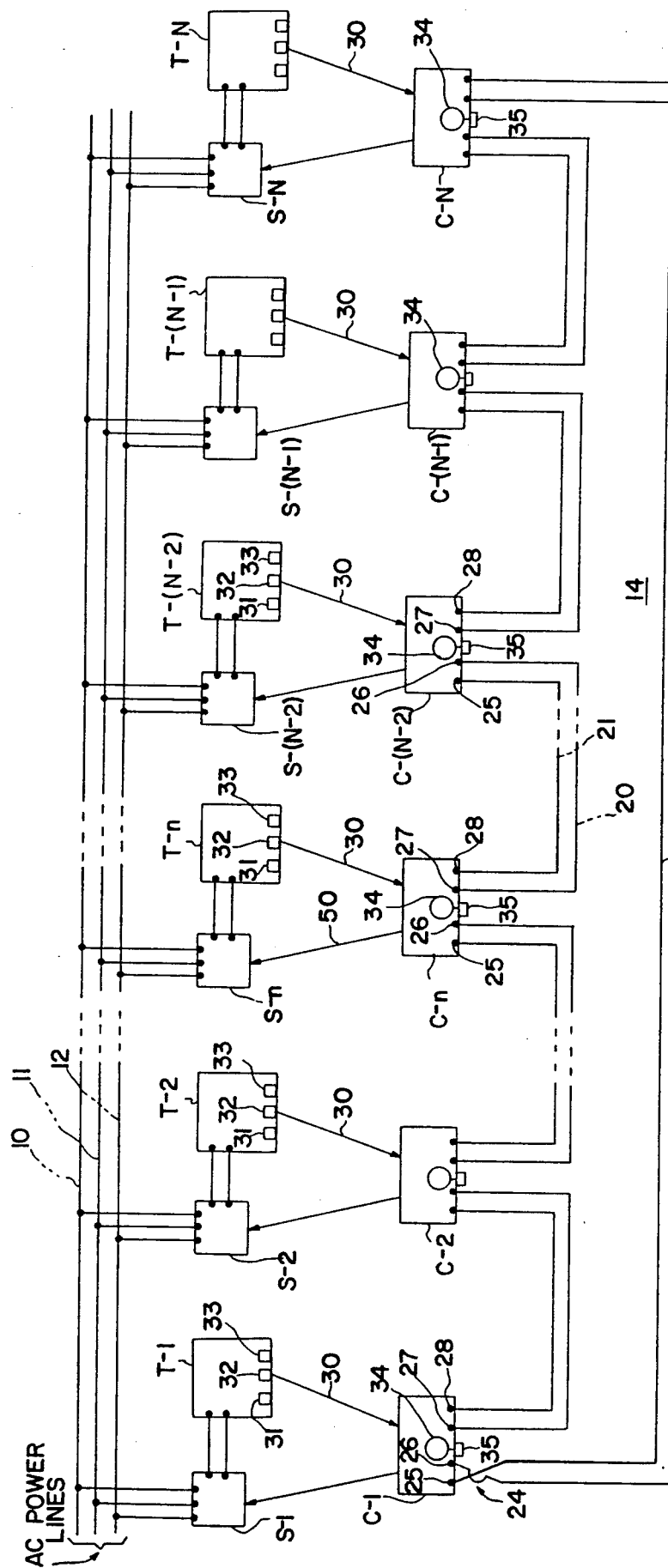

In FIG. 1, in an embodiment of the activating method and system of the invention, there are shown electromagnetically energized powerful machine tools "T". For example, these machine tools are electromagnetically powered presses, and they are individually designated as the respective tools T-1, T-2, ... T-n, ... T-(N−2), T-(N−1), and T-N.

Each machine tool T is equipped with a microprocessor controller designated respectively by C-1, C-2, ... C-n ... C-(N−2), C-(N−1), and C-N. There are shown three-phase AC (Alternating Current) power supply lines in the manufacturing plant designated by the reference numbers 10, 11, 12. An electronic power control switch "S" which may include a step-down or step-up transformer and/or rectifier, is associated with each electromagnetic power tool T.

These electronic power control switches are designated S-1, S-2, ... S-n, ... S-(N−2), S-(N−1), and S-N. When any one of the switches S is activated, it serves to supply a powerful burst of electrical energy from the power lines 10, 11 and 12 to its respective associated electromagnetic power tool T. The controllers of the individual power tools are connected together in series in a control loop or ring 14 provided by a twisted pair of wires 20 and 21.

EACH SUCCESSIVE PERMISSION SIGNAL BEING PASSED AROUND THE CONTROL RING IS OF REVERSED POLARITY

This control ring 14 functions as a permission-signal-passing ring, as will be explained. The permission signal being passed is a low voltage signal, for example, about five or six volts, of positive or negative polarity. Each successive permission signal being passed around ring 14 is of opposite polarity from the preceding permission signal for reasons now to be explained.

In order to provide this change in polarity of successive permission signals being passed around the control ring 14, the polarity of the permission signal going into one of the controllers C is intentionally inverted. Keeping in mind that each of the controllers C is arranged to pass along a permission signal of the same polarity as most recently received, it will be understood that an intentional inversion of the polarity of the signal going into any one of the controllers (for example, the controller C-1) will cause that particular controller to pass along in ring 14 a signal of reversed polarity from its incoming signal. This polarity-reversing controller C-1 may be considered to be the "prime" controller.

The advantage of causing each successive permission signal going around the ring to have reversed polarity is that each individual controller can thereby independently determine when a permission signal has passed completely around the ring 14 by comparing the polarity of its incoming signal with the polarity of its most recent outgoing signal.

For example, when the polarity of the voltage of the signal on the wires 20 and 21 arriving at the pair of input terminals 25 and 26 of the controller C-n is opposite to the polarity of the voltage of the signal which was most recently transmitted from its pair of output terminals 27 and 28, then its controller C-n quickly determines that it has received permission to "fire" (i.e., to trigger the actuation of) its associated tool T-n. In other words, the permission signal arriving at the input terminals 25 and 26 of the controller C-n is a positive-going signal pulse; whereas, the permission signal most recently transmitted from its output terminals 27 and 28 was a negative-going signal pulse, and thus their polarities are opposite, which means that permission-to-fire is given if the controlled tool T-n is "ready".

When a particular controller thereby determines that the permission signal has been passed completely around the control ring 14, such determination means that no other machine tool is firing (being actuated) and, therefore, the particular controller may fire (actuate) its associated machine tool (if the tool is "ready") without imposing undue electrical loading on the A power lines 10, 11, 12.

By virtue of this permission passing control method and system, there is no need for a complicated system involving a centralized processing computer connected to all of the machine tools for keeping track of the present status of each machine tool at each instant of time. Moreover, there is a consequent great flexibility in installation of the machine tools. At any time a machine tool T with its controller C can be added to or removed from the control ring 14 without the need for changing any programming of any of the controllers C.

In order to provide a more complete understanding and appreciation for the present invention, the operation and further aspects of the method and system illustrated in FIG. 1 will be explained. The polarity of the permission signal incoming into the controller C-1 (which is considered the "prime" controller) is inverted. This inversion of electrical signal into the first or "prime" controller is provided by a switch inside of the first controller C-1 or by reversing the polarity of the twisted pair as shown at 24, where they are connected to the input terminals into this first controller.

Each controller has a pair of input terminals 25 and 26 and a pair of output terminals 27 and 28 for connection into the control ring circuit 14.

Each of the controllers can be in either of two states: (A) "not ready to fire" (not ready for the associated tool to be triggered), or (B) "ready to fire" (the associated tool is ready to be triggered). The arrows 30 extending from the respective tools T to the respective controllers C indicate that the controller is responsive to the various sensors 31, 32, 33 associated with its controlled power tool T. Such sensors serve to monitor: material in proper place, safeguards in proper place, plus any other pre-firing conditions required to be met. For example, if one of the machine tools T is an elevator, then one of the pre-firing conditions for the elevator motor would be that the elevator doors are closed.

When a controller C is in state A (not ready) then that controller immediately passes on the same polarity permission signal as was received. For example, when a positive-going signal pulse is sent by the "prime" controller C-1 along the wires 20, 21. This positive-going pulse (i.e. this "permission to fire" signal) is passed successively along the lines 20, 21 from one controller to the next, until this positive-going permission signal reaches the input terminals 25, 26 of a controller C-n of a controlled electromagnetic tool T-n which happens to be ready to fire.

When controller C-n senses a ready-to-fire tool T-n, this controller shifts into "ready" state B. When this "ready" controller C-n receives the positive-going permission signal sent from the previous controller, then this "ready" controller C-n does not pass along the permission signal. Instead, this "ready" controller C-n in state B sends a firing signal as shown by the arrow 50 to its associated power control switch S-n, thereby causing the power tool T-n to be fired (actuated into operation).

As explained above, the polarity of the input signal going into the first controller C-1 is always reversed by an input polarity reversal means, for example, as indicated at 24. Consequently, the polarity of its output signal is always reversed. Thus, each successive permission signal being sent around the control loop 14 is always reversed in polarity from the previous signal. Therefore, when a "ready" controller C-n in state B receives an input signal which is opposite to its last output signal, the situation has occurred that the control signal has traversed completely around the control loop 14 provided by the twisted-pair of wires 20, 21. Consequently, no other controller can be simultaneously activated; thus, it is an appropriate time for the "ready" controller C-n to cause its tool T-n to be fired.

As soon as the controlled tool T-n has completed its operating duty cycle, for example, such as a power stroke, then the activated controller C-n passe along the same plurality permission signal as had been received, namely, a positive-going signal is transmitted from its output terminals 27 and 28 along the wires 20, 21. This transmitted signal is then passed along the loop 14 from controller-to-controller until this signal reaches another controller whose associated tool is "ready", for example, the tool T-(N−1). This ready controller C-(N−1) compares its positive-going input signal with its last negative-going output signal.

Since an input signal is now being received of which the polarity is opposite to the last output signal (i.e., positive-going pulse vs. previous negative-going pulse, or vice versa), this "ready" controller now causes its controlled and ready tool to be fired, if its "priority count" has been reached, as will be explained. Then, after the power stroke duty cycle of its controlled tool is complete, this activated controller passes along the positive-going (or negative-going) pulse which it had received, and so forth. Thus, the permission-signal passing sequence progresses around the control loop 14.

ALL CONTROLLERS ARE EQUALLY SELF-CONTAINED

In this advantageous method and system, all of the controllers C are "equal", they are all self-sufficient, i.e. there is no "master" and no "slave" relationship between the controllers. There is one "prime" controller C-1. It can be identical to all of the other controllers, except for the polarity-reversal 24 of the permission signal which it transmits on each successive travel of the permission signal around the control ring 14.

Since all of these controllers C are advantageously "equal", they all, therefore, operate independently, and such independent operation can be extraordinarily fast. For example, each "not ready" controller can pass along the permission signal in less than 100 microseconds, except in those times when the machine tool has been triggered into performance of its duty cycle. Thus, there is only an insignificant amount of delay perceived by the human operators associated with the various powerful machine tools T in the permission-signal-passing ring 14 when they are waiting, even though no two of them can be fired at the same time.

ALL CONTROLLERS ARE ALWAYS IMMEDIATELY ABLE TO PASS-ALONG THE PERMISSION SIGNAL

In order to achieve this rapid passing-along of the permission signal when a tool T is in a "not ready" state "A", each of the various supervisory-routines within each controller C has embedded within it a permission-signal-passing program. For example, the controller may momentarily be involved in supervisory-routine, such as checking: "Are all of the safety guards properly positioned?"–"Is the workpiece properly positioned?"–'Are the opposed tool dies fully retracted in readiness for a full stroke?"–and so forth. Embedded in each such supervisory-routine is the State "A" permission-signal-passing routine. Consequently, no matter what other tasks the controller is supervising, it is always immediately able to pass-along the permission signal until such time as the controlled tool is ready and the priority count has been reached.

There will be a perceived delay when an operator knows that a particular machine is "ready" to perform its duty cycle and must wait until another machine tool completes its duty cycle. However, the duty cycle of each machine tool is relatively brief compared with the intervening relatively longer time periods when each tool is in its "not ready" state.

PRIORITIZING OF MACHINE OPERATION

In order to provide for prioritizing of the operation of the various machine tools T, there is a permission-signal-passing counter 34 in each controller C which is pre-settable by a manually operable keypad 35. The reason for prioritizing machine operations is to optimize their relative frequencies of actuation, so as to fit into the overall production scheduling for the manufacturing facility.

For example, today's manufacturing production scheduling for this plant may call for more of the specific products made by the machine tool T-(N−2). Thus, its counter 34 is manually set by the operator for "1", meaning that it has the highest priority. Each time that its controller C-(N−2) receives a permission signal for permission to actuate its controlled tool T-(N−2), that tool will be actuated, if it is "ready".

The specific product being produced by the machine tool T-N may have second priority. Thus, the operator sets its counter 34 for "2" meaning that its controller C-N will pass along the permission signal on its first arrival, even if the tool T-N is "ready". On the second arrival of the permission signal the pre-set count of this counter will have become satisfied. Accordingly, the tool T-N will be actuated by the controller C-N on this second arrival of the permission signal, if this tool is "ready". If not then ready, this tool will be actuated on any subsequent arrival of the permission signal at a time when this tool will have become "ready", because the pre-set priority count has been reached.

In FIG. 2 is shown the functional block sequence of the program for operation of each of the microprocessor controllers C in the method and system of FIG. 1. When a controller C is turned on, it automatically performs its start-up self-tests 42. The controller is continuously monitoring the status of the sensors 31, 32 and 33 (FIG. 1) mounted on its associated machine tool as indicated by the monitoring connection 30 for determining when the machine tool is in ready status for being triggered to perform its duty cycle. Function block 44 represents this continuous monitoring of the various sensors.

The controller is programmed for continuously determining whether all of the sensors show a "ready" status, as shown at 46. For so long as this ready determination 46 is "NO", as shown by arrow 48, the controller is in its not ready state (or mode) "A", in which the controller automatically immediately passes a positive-going pulse (or negative-going pulse) permission signal from its output terminals 27, 28 (FIG. 1). This permission signal being passed is of the same polarity as the signal which was received, on its input terminals 25, 26 as shown by the function block 52. Such state "A" automatic passing of the permission token 52 occurs within less than 100 microseconds of receiving the permission token at the input terminals 25, 26. After passing the permission signal, the program rereads the sensors, as shown by the arrows 53.

When determination regarding the "ready" state of the machine tool is "YES", as shown by arrow 54, then there occur final status checks, as shown at 56. For example, such final status checks 56 can include re-checking of all of the safety guards for the machine tool, polarity checks on the read-outs from the various sensors, and so forth. If the final status checks 56 are not satisfied, as shown by the NO" arrow 58, then the controller automatically continues to pass the token signal, as shown by the function block 52. As shown by the function arrows 53, the program immediately recycles back to whichever control (housekeeping) function is then being performed, whenever the permission signal has been passed.

It is to be understood that the permission signal passing sub-routine 52 is embedded within the various "housekeeping" functions being performed while the machine is in State "A" (not ready). Thus, while each controller is performing its various supervisory ("housekeeping") functions, the passing of the permission signal goes on essentially immediately. Consequently, there is no significant inadvertent wasting of time. For example, a controller could be waiting for a safety guard to close properly or be waiting for the workpiece to be loaded into proper position, and during such waiting periods the controller is immediately passing along the permission signal as soon as received and then returns to its on-going control function as shown by arrow 53.

All of the respective controllers C in the control loop 14 are behaving in a similar manner. The respective controllers C are all busy performing their various supervisory functions for their respective controlled machine tools T, each to get ready to fire. In the meanwhile they are each immediately passing along the permission signal with insignificant delay.

If the final status checks 56 are satisfied, as shown by the "YES" arrow 60, then the controller is in its ready state or mode "B", such that a firing trigger signal may be transmitted to the associated power control switch S for actuating the machine tool, if other conditions are satisfied, as shown by the subsequent functional blocks in FIG. 2.

As shown by functional blocks 62, 64 and 66, each controller continuously compares the polarity of received and passed permission signals, including storing the polarity of each received permission signal and also storing the polarity of each most recently passed permission signal. Function block 68 indicates that if the result of the polarity comparison 62 causes a "NO" decision to be made, as shown by an arrow 70, then the program recycles back as shown by an arrow 72 to the comparison function 62.

If the result of the polarity comparison step 62 causes a "YES" decision to be made, as shown by an arrow 74, the program proceeds to the permission-signal-passing counter state 34, including an adjustable count pre-setter 76 and a counter 78 for pre-setting the relative production priority for the particular machine tool under the control of this controller. The counter 78 counts the number of times that permission to fire has been received, as indicated by the "YES" signal 74, i.e. the number of times that the polarity of the incoming (received) permission signal is opposite to the polarity of the most recently passed permission signal. The adjustable count pre-setter 76 is manually pre-settable by means of a keypad function 35.

If the pre-set permission count has not yet been reached, as shown by a "NO" arrow 80, then the program recycles back, as shown by arrow 72, to the comparison function 62. Also, a "NO" arrow 82 leading to another permission-signal passing function block 52 shows that while in State "A" mode "not ready to fire", the controller is immediately passing along the permission signal with insignificant waste of time, and as shown by arrow 83 is storing its polarity, because this permission signal passing sub-routine 52 is embedded within all of the other functions being performed while the machine tool is not ready or, if ready, while the pre-set priority count has not yet been reached.

When the pre-set priority count has been reached, as shown by a "YES" arrow 84, the program commands actuation of the machine, as shown by function block 86, and a control signal shown by an arrow 88 causes a firing signal to be transmitted, as shown by block 90 to the tool control switch S (FIG. 1) thereby actuating the controlled machine tool T. As shown by an arrow 92, initiation of the firing sequence causes the program to wait for completion of the tool duty cycle, as shown by the function block 94. Such completion of the tool duty cycle is sensed by appropriate sensors associated with the workpiece and tooling and/or by counting a predetermined number of computer clock pulses.

While completion of the tool duty cycle is being awaited, the controller does NOT pass the permission signal along the control ring 14 (FIG. 1), thereby advantageously preventing any other machine tool along the ring 14 from being actuated while the present machine tool is still in operation. Consequently, there is no overlapping of the duty cycles of any two or more machine tools, and thus the power lines 11, 12 and 13 never experience a peak electrical load exceeding the load imposed by operation of one machine tool T. Even if there are twenty or thirty or more of these electrically energized machine tools, only one of them is permitted to be actuated at a time, and no other machine can begin to be actuated until the presently-actuated machine tool has completed its duty cycle. As soon as that tool duty cycle has been completed, as shown by an arrow 96, a permission signal of the same polarity as received is immediately passed along. Whenever a permission signal is passed along by a controller, the polarity of that passed signal is stored, as shown by arrows 55 and 83 leading to the storage function 66. Finally, the program returns via 97 to begin the next overall cycle of operation.

While the invention has been particularly shown and described with reference to preferred embodiments, it will be understood by those skilled in the art that various charges in form and details may be made without departing from the spirit and scope of the invention as defined by the appended claims and reasonable equivalents of the claimed elements.

I claim:

1. An activating method for controlling the electrical power input to a plural number of electrical tools in a manufacturing plant where such machine tools are of the type having a relatively brief duty cycle involving a large usage of electrical power during the performance of the brief duty cycle and where such tools require an insignificant usage of electrical power during standby while each tool is being readied for performance of its next duty cycle, said method preventing the performance of more than one duty cycle at the same time for limiting peak electrical load demand caused by said tools, said method comprising the steps of:

providing a plurality of controllers equal in number to said plural number of electrical tools, wherein respective controllers monitor and control respective electrical tools and wherein each controller has a pair of input terminals and a pair of output terminals, connecting the pair of output terminals of each respective controller to the pair of input terminals of another controller for arranging said controllers in an electrical permission signal passing ring, choosing one of said controllers as a first controller with a last controller in said ring having its output terminals connected to the input terminals of said first controller, transmitting an electrical permission signal of predetermined character from the output terminals of said first controller, automatically transmitting from the output terminals of any controller in said ring, except said first controller, an electrical permission signal of the same character as received at its input terminals whenever the electrical tool being monitored by that controller is not ready to perform its duty cycle, automatically transmitting from the output terminals of said first controller an electrical permission signal of character inverted from the character of the electrical permission signal as transmitted from the output terminals of said last controller, whenever the electrical tool being monitored by said first controller is not ready to perform its duty cycle, shifting a controller into a ready state whenever its controlled electrical tool is ready to perform its duty cycle, allowing any controller in a ready state to trigger its controlled electrical tool into performance of a duty cycle whenever the character of the electrical permission signal received at its input terminals is inverted in character from the character of the permission signal most recently transmitted from its output terminals, after an electrical tool has been triggered into performance of a duty cycle by its controller, restraining transmission of a permission signal from the output terminals of said controller until its controlled tool has completed its duty cycle, and transmitting from the output terminals of any controller except the first controller a permission signal of the same character as received after its controlled tool has completed performance of its duty cycle.

2. The activating method of claim 1 including the further steps of:

setting a predetermined priority count for at least one of the controllers included in said permission signal passing ring to prioritizing the operation of its controlled electrical tool relative to electrical tools being controlled by other controllers in said ring, counting the number of times that said one controller when in the ready state receives an electrical permission signal of character inverted from the character of its most recently transmitted electrical token signal, and allowing said one controller in the ready state to trigger its controlled electrical tool into performance of a duty cycle only after said predetermined priority count has been reached.

3. The activating method of claim 1, in which:

said predetermined character of an electrical permission signal is a first polarity of said signal, and an electrical permission signal of character inverted from said predetermined character is of a second polarity opposite to said first polarity.

4. The activating method of claim 1, in which:

said electrical permission signals are electrical pulses, said electrical permission signal of predetermined character is a positive-going pulse, and an electrical permission signal of character inverted from said predetermined character is a negative-going pulse.

5. An activating system for controlling the electrical power input to a plural number "N" of electrical tools in a manufacturing plant where such electrical tools are of the type having a relatively brief duty cycle involving a large usage of electrical power during the performance of the brief duty cycle and where such electrical tools require an insignificant usage of electrical power during standby while the electrical tool is being readied for performance of its next duty cycle, said activating system preventing the performance of more than one duty cycle at the same time for thereby limiting peak electrical load demand caused by said electrical tools, said activating system comprising:
- a plurality of controllers equal in number to said plural number N, wherein each controller monitors and controls a respective machine tool and wherein each controller has a pair of input terminals and a pair of output terminals,
- a ring circuit connecting the pair of output terminals of each respective controller to the pair of input terminals of another controller,
- one of said controllers being a first controller,
- said first controller being arranged for transmitting an electrical permission signal from the output terminals of said first controller having a characteristic opposite from a characteristic of the permission signal transmitted from the output terminals of the controller in said ring immediately preceding said first controller,
- all of the other controllers in said ring except said first controller being arranged for transmitting from their output terminals an electrical permission signal having a characteristic the same as a characteristic of the permission signal transmitted from the output terminals of the respective preceding controllers in said ring,
- means for shifting a controller into a ready state whenever its controlled electrical tool is ready to perform its duty cycle,
- means for causing said first controller in said ring in said ready state to trigger its controlled electrical tool into performance of a duty cycle whenever the characteristic of the electrical permission signal transmitted from the output terminals of the respective preceding controller in said ring is the same as the characteristic of the permission signal most recently transmitted from the output terminals of the ready-state first controller,
- means for causing any controller in said ring in a ready state except said first controller to trigger its controlled machine tool into performance of a duty cycle whenever the characteristic of the electrical permission signal transmitted from the output terminals of the respective preceding controller in said ring is opposite from the characteristic of the permission signal most recently transmitted from the output terminals of such ready-state controller, and
- means for causing any such ready-state controller to refrain from transmitting a permission signal from its output terminals until its controlled tool ha completed its duty cycle.

6. An activating system as claimed in claim 5, in which:
- said characteristic is a polarity of an electrical permission signal, and
- said opposite characteristics is reversed polarity.

7. An activating system as claimed in claim 5, in which:
- said electrical permission signals are electrical pulses,
- said characteristic is a positive-going direction of a pulse, and
- said opposite characteristic is a negative-going direction of a pulse.

8. An activating system as claimed in claim 5, in which:
- at least one of said controllers includes settable counting means for setting a priority of operation of its controlled tool relative to other tools having controllers in said ring,
- said counting means being arranged for counting the number of times that a permission signal is transmitted from the output terminals of said one controller after said one controller is in a ready state, and
- means in said one controller for triggering its controlled tool into performance of a duty cycle after a pre-set count has been reached.

9. Control apparatus for controlling the operation of an electrically energizable tool comprising:
- a pair of input terminals,
- a pair of output terminals,
- means for responding to status of the electrically energizable tool being controlled by said control apparatus for determining that its controlled tool is ready to be triggered into performance of a duty cycle,
- means for automatically transmitting an electrical permission signal from said output terminals upon reception of an electrical permission signal at said input terminals,
- means for triggering its controlled tool into performance of a duty cycle when (a) its controlled tool is in a ready state, and (b) a characteristic of a permission signal being received at said input terminals is opposite to a characteristic of a permission signal most recently transmitted from said output terminals, and
- means for restraining automatic transmission of a permission signal from said output terminals until its controlled tool has completed performance of a duty cycle.

10. Control apparatus as claimed in claim 9, further comprising:
- pre-settable counter means for pre-setting a number of times that a permission signal is transmitted from said output terminals after its controlled tool is in a ready state, and
- said triggering means being responsive to said pre-settable counter means for triggering its controlled computer into performance of a duty cycle after a pre-set count has been reached by said pre-settable counter.

11. Control apparatus as claimed in claim 9, in which:
- said characteristic of a permission signal is a polarity of the permission signal,
- said apparatus includes means for storing an indication of the polarity of a permission signal most recently transmitted from said output terminal, and
- said apparatus includes means for comparing the polarity of a permission signal being received at said input terminals with said stored indication of the polarity of a permission signal most recently transmitted from said output terminals.

* * * * *